E. B. PAUL.
COIN HANDLING APPARATUS.
APPLICATION FILED MAR. 28, 1919.
1,390,583.
Patented Sept. 13, 1921.
6 SHEETS—SHEET 3.
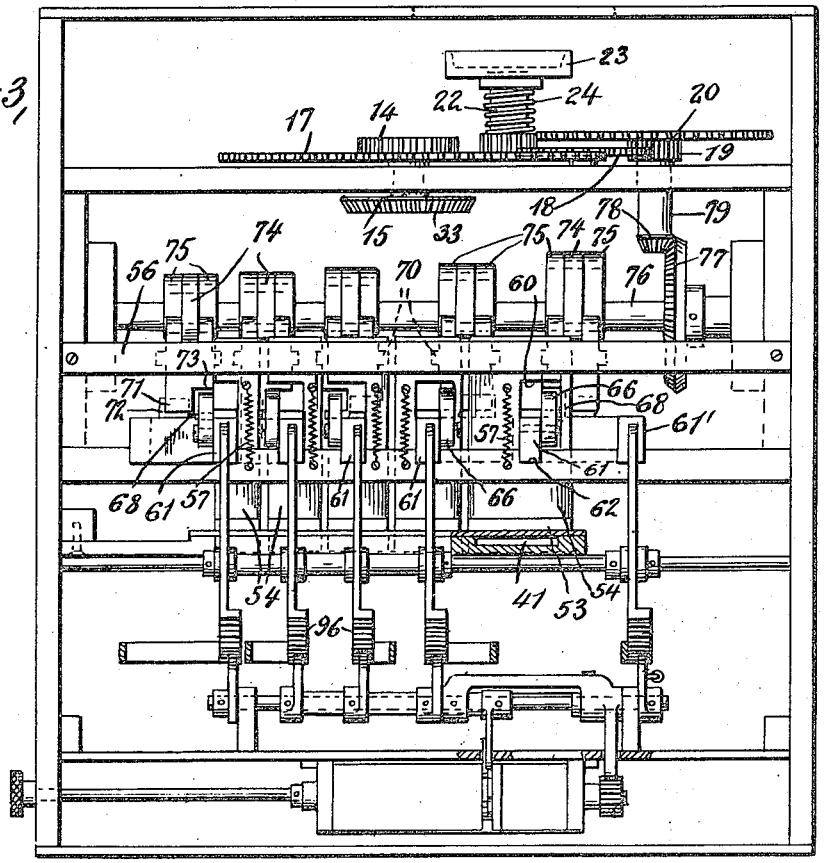
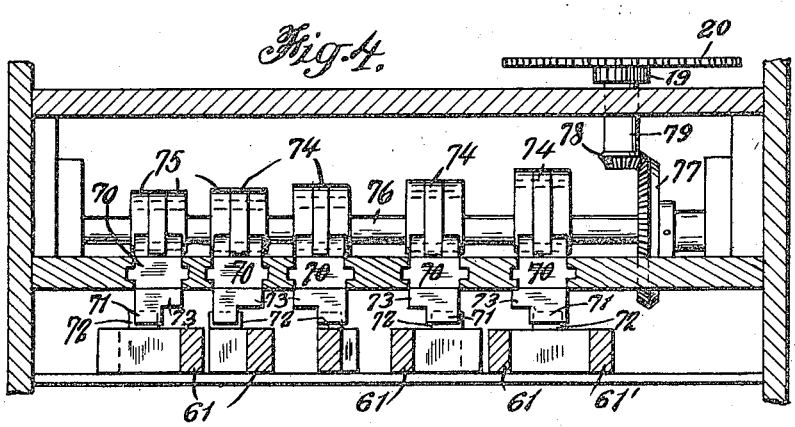
Inventor
Edward B. Paul
By his Attorneys
Pennie Davis Marvin & Edmonds E. B. PAUL.
COIN HANDLING APPARATUS.
APPLICATION FILED MAR. 28, 1919.
1,390,583.
Patented Sept. 13, 1921.
6 SHEETS—SHEET 4.
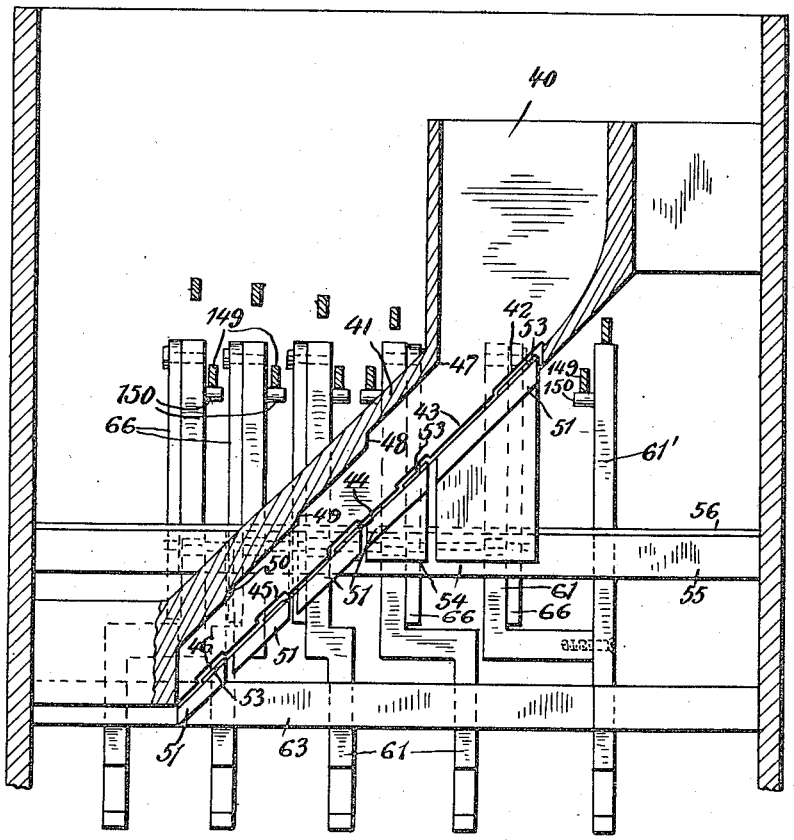
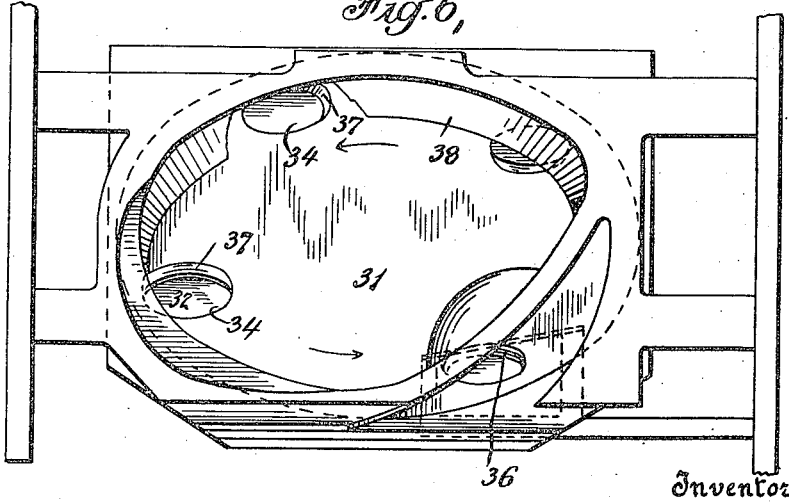
Inventor
Edward B. Paul
By his Attorneys
Pennie, Davis, Marvin & Edmonds E. B. PAUL.
COIN HANDLING APPARATUS.
APPLICATION FILED MAR. 28, 1919.
1,390,583.
Patented Sept. 13, 1921.
6 SHEETS—SHEET 5.
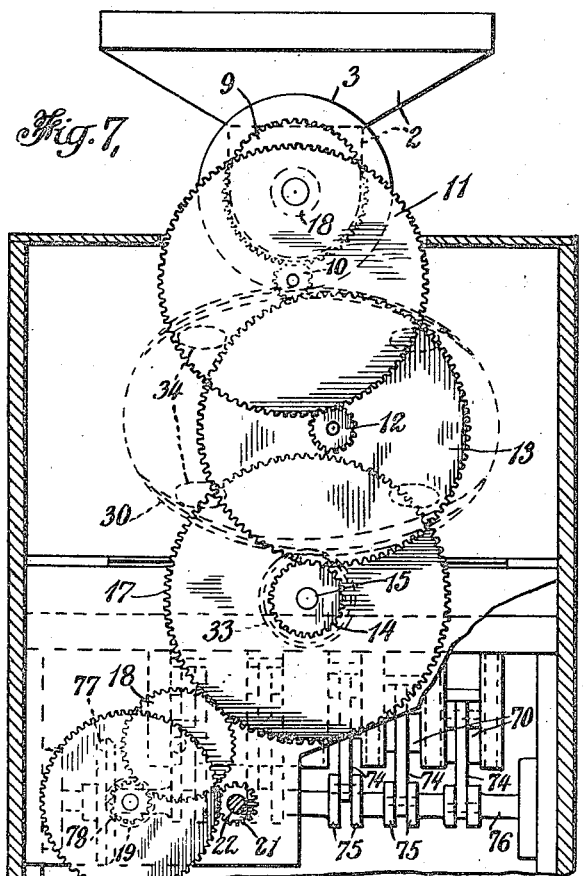
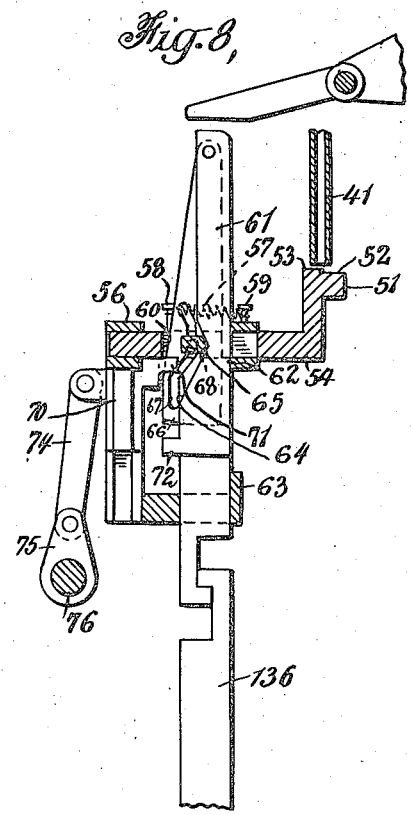
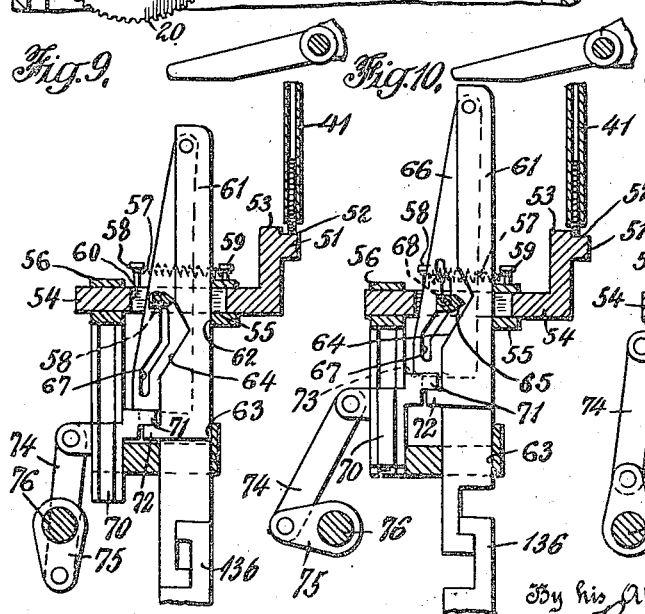
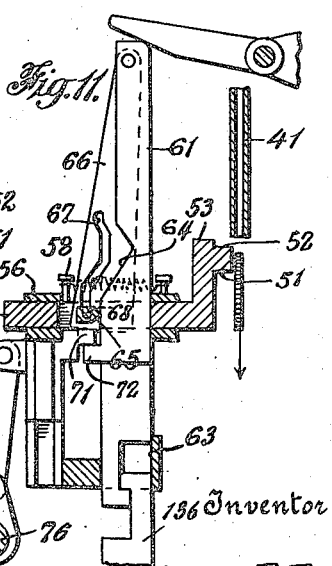
Inventor
Edward B. Paul
By his Attorneys

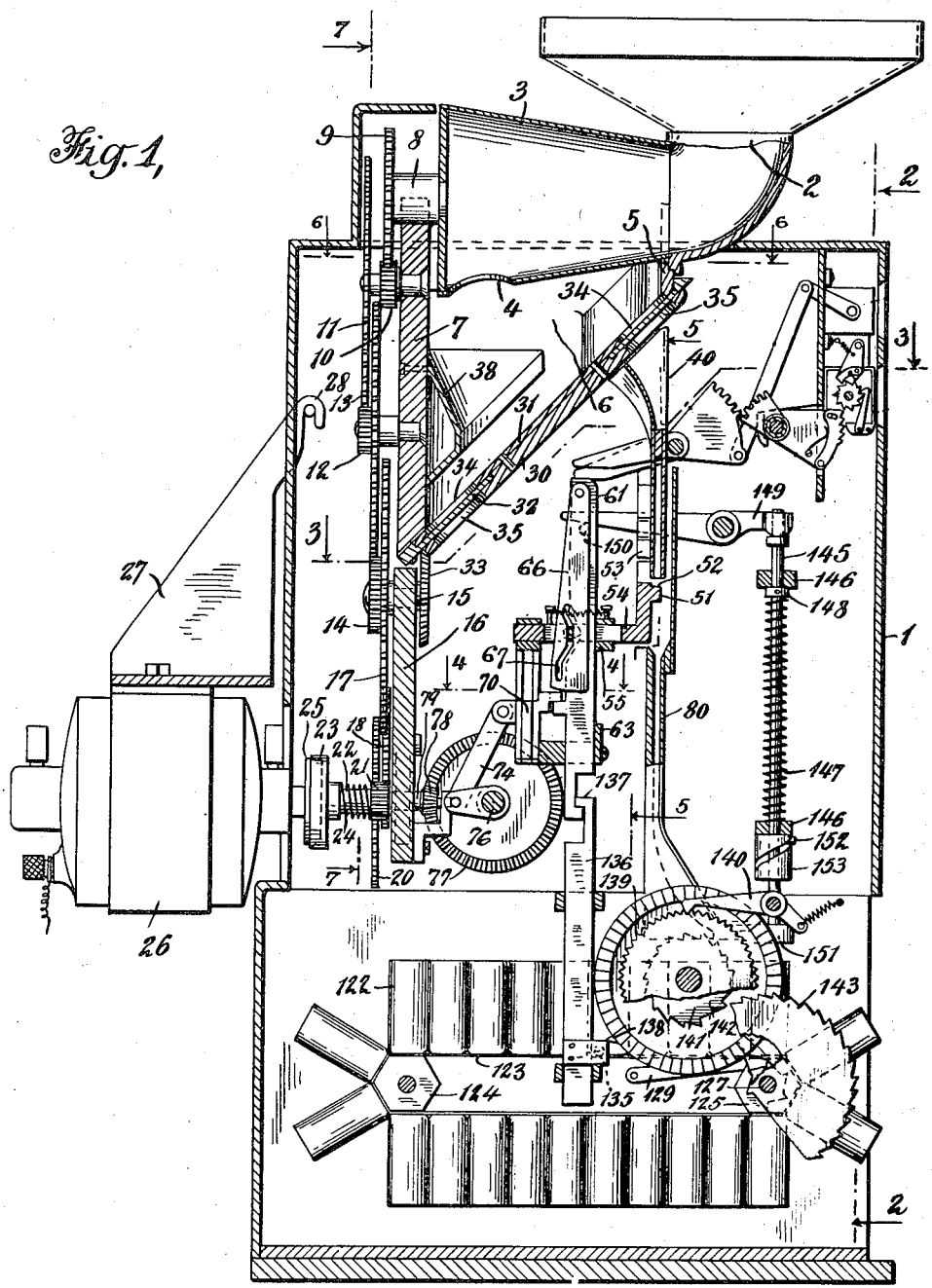

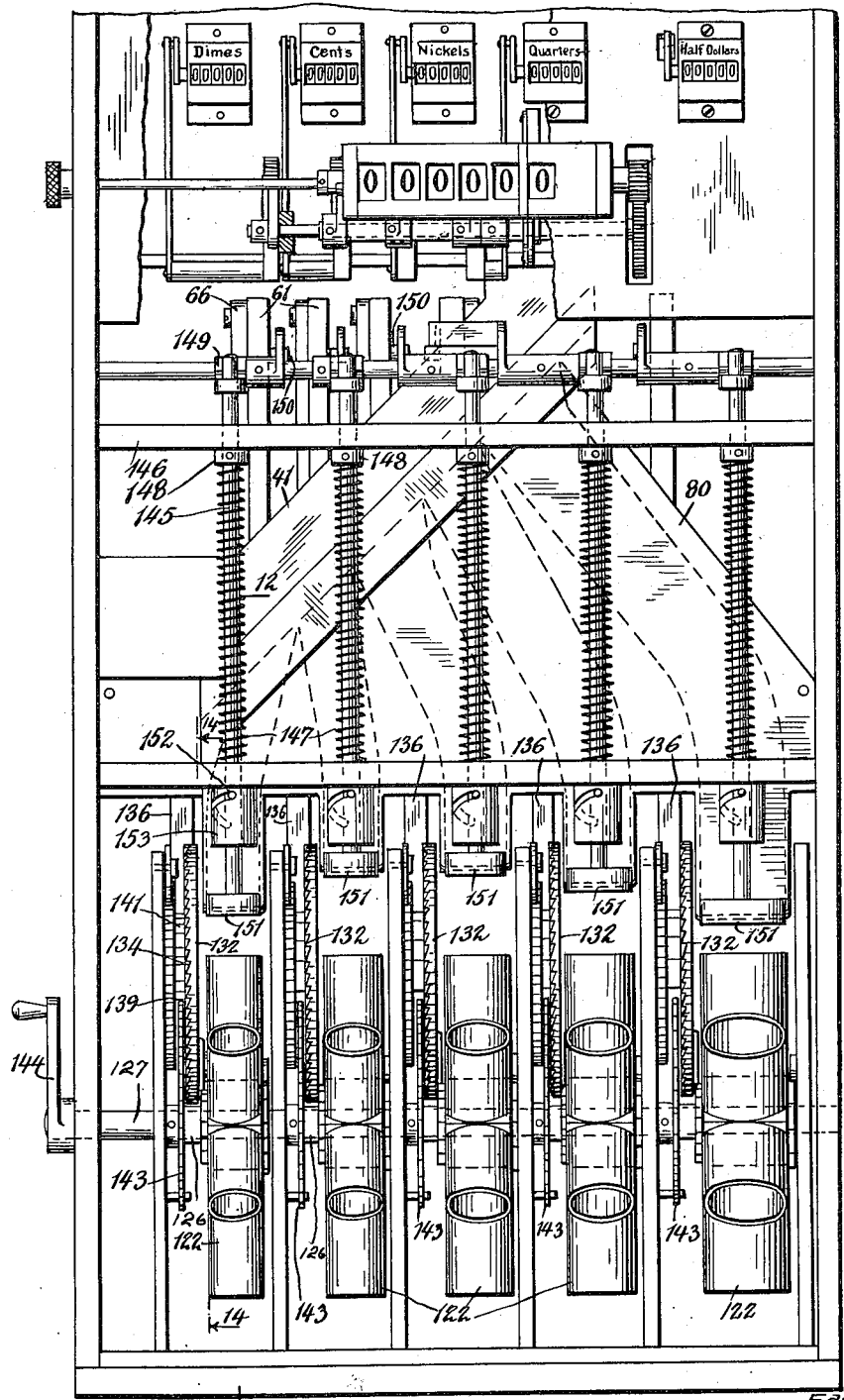

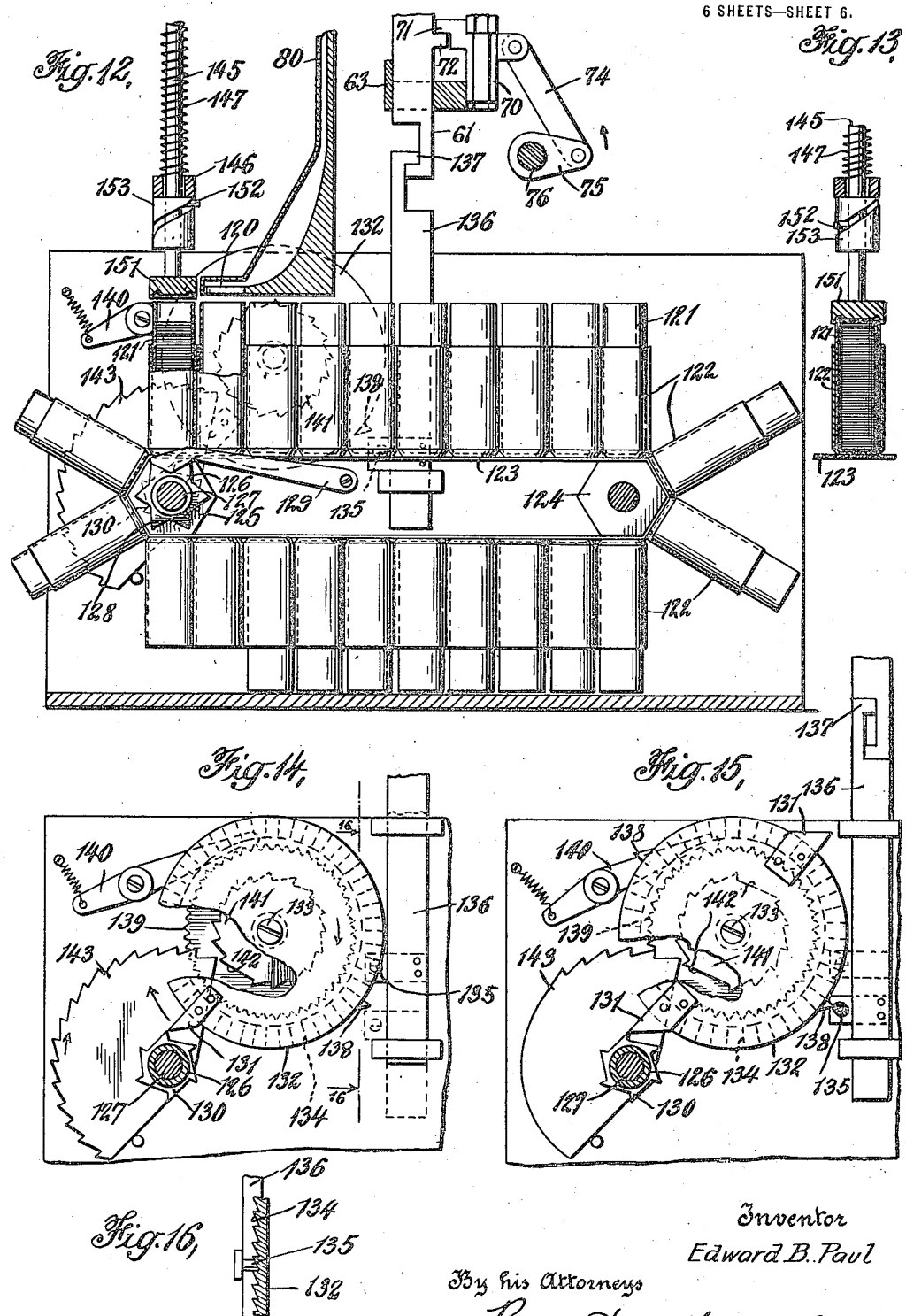

UNITED STATES PATENT OFFICE.

EDWARD B. PAUL, OF LANCASTER, PENNSYLVANIA, ASSIGNOR TO LANCASTER AUTO-
MATIC MACHINE COMPANY, OF LANCASTER, PENNSYLVANIA, A CORPORATION OF
DELAWARE.

COIN-HANDLING APPARATUS.

1,390,583.      Specification of Letters Patent.      Patented Sept. 13, 1921.

Original application filed November 16, 1918, Serial No. 262,767. Divided and this application filed March 28, 1919. Serial No. 285,929.

*To all whom it may concern:*

Be it known that I, EDWARD B. PAUL, a citizen of the United States, residing at 7 North Duke street, Lancaster, in the county of Lancaster, State of Pennsylvania, have invented certain new and useful Improvements in Coin-Handling Apparatus; and I do hereby declare the following to be a full, clear, and exact description of the invention, such as will enable others skilled in the art to which it appertains to make and use the same.

The present invention which relates to coin handling apparatus is directed particularly to mechanism by which coins may be stacked and wrapped in packages containing a predetermined number of coins of a particular denomination. This mechanism may be employed in conjunction with the coin assorting and counting apparatus constituting the subject-matter of my co-pending application, Serial No. 262,767 filed November 16, 1918, of which the present application is a division, or it may be employed in conjunction with any other form of coin handling apparatus in which it is desired that a wrapping of the coins shall take place at some stage of the operation.

In accordance with the present invention there is provided a series of receptacles adapted to hold wrappers into which coins may be supplied one at a time until a predetermined number have been deposited therein, whereupon the receptacles are advanced to bring an empty wrapper into position to receive a like predetermined number of coins. The mechanism for controlling the advance of the receptacles is adapted to be actuated by an operative connection with a part of the coin handling apparatus with which the wrapping mechanism is associated, so that, for each coin assorted, counted or otherwise handled by the apparatus, an actuation of a moving element of the wrapping mechanism takes place, and when a predetermined number of such actuations, corresponding to the number of coins to be supplied to each wrapper, has occurred, the moving element acts to advance the receptacles to bring an empty wrapper into position to have coins supplied thereto.

In connection with the other parts of the wrapping mechanism, there is provided an arrangement by which the mechanism for controlling the advance of the receptacles may be manually reset to its zero position in the event that the machine is stopped with a wrapper only partially filled and it is desired to put the machine in such a condition that upon a subsequent operation coins of the required number will be supplied to an empty wrapper.

The particular nature of the invention, as well as other objects and advantages thereof, will appear more clearly from a description of a preferred embodiment, which is shown in the accompanying drawings in combination with the coin handling mechanism forming the subject matter of my application referred to above.

In these drawings,

Figure 1 is a side elevation of the entire apparatus, chiefly in section;

Fig. 2 is a front elevation in section along the line 2—2 of Fig. 1;

Fig. 3 is a plan view in section along the line 3—3 of Fig. 1;

Fig. 4 is a plan view in section along the line 4—4 of Fig. 1;

Fig. 5 is a front elevation of parts of the assorting and counter actuating mechanism in section along the line 5—5 of Fig. 1;

Fig. 6 is a plan view of the receptacle into which coins are supplied and by which they are fed one at a time into the assorting mechanism;

Fig. 7 is a rear elevation, showing the gear trains for driving various parts of the apparatus, the casing being taken in section along the line 7—7 of Fig. 1;

Figs. 8, 9, 10 and 11 are detailed views showing different positions assumed by the coin-controlled counter actuating devices, during a cycle of operations of the apparatus;

Fig. 12 is an elevation of the coin-wrapping mechanism, taken in section along the line 12—12 of Fig. 2;

Fig. 13 is a detailed view of the mechanism for crimping the end of a wrapper about one end of a stack of coins;

Fig. 14 is a view in section, along the line 14—14 of Fig. 2, of the operating parts of mechanism adapted to wrap a predetermined number of coins;

Fig. 15 is a view of similar parts of a mechanism for wrapping a different predetermined number of coins; and Fig. 16 is a detailed view of the operating connection between the counter actuating devices and the wrapping mechanism, taken along the line 16—16 of Fig. 14.

Referring to the drawings in which similar reference characters denote similar parts throughout the several views, 1 is the casing of the apparatus which should preferably be constructed of metal and upon the top of which is a funnel 2 into which coins may be supplied. The lower end of the funnel is bent at a right angle and communicates with a rotary hopper 3 provided with an aperture as at 4, through which coins are discharged when the aperture occupies its lowermost position. The forward end of hopper 3 is movably mounted in a suitable bearing formed in the front wall 5 of the coin feeding mechanism into which the coins fall when they leave the hopper. The rear wall 7 of this mechanism supports at its upper edge a trunnion 8 attached to the closed end of the hopper and carrying a gear 9 meshing with a pinion 10 on an axle attached to the wall 7, and having a gear 11 meshing with a pinion 12 mounted on an axle on the rear wall 7 and having a gear 13 which meshes with a pinion 14 on a shaft 15 mounted in a partition 16 extending between the side walls of the casing. Associated with the pinion 14 is a gear 17, which through the train of gears and pinions 18, 19, 20 and 21, is connected to a shaft 22 mounted in a suitable bearing near the bottom of the partition 16. Slidably mounted on the end of shaft 22 is a cup-shaped member 23 adapted to be forced outwardly by a spring 24 surrounding the shaft. The member 23 serves as one part of a clutch, the other member 25 of which is attached to the shaft of a motor 26 suspended from a bracket 27 which, at its upper end, is provided with hooks 28 adapted to fit over pins attached to the rear wall of the casing, the arrangement being such that when the bracket is in place, the weight of the motor will tend to hold the clutch members 23 and 25 firmly in engagement to provide a driving connection between the motor and the moving parts of the apparatus.

The mechanism 6 for feeding coins one at a time to the assorting and counting mechanism from which they are subsequently discharged into the wrapping mechanism forms the subject-matter of a co-pending application Serial No. 285,928 filed March 28, 1919, as a division of application Serial No. 262,767 referred to above.

Briefly described, this mechanism comprises a receptacle of oblong contour and provided with an inclined bottom made up of a lower plate 30 and an upper plate 31 connected together and rotatably mounted upon a fixed annular support 32 extending between the plates. For rotating the combined plates the periphery of the lower plate is provided with beveled teeth meshing with a corresponding beveled gear 33 attached to the inner end of shaft 15 and hence driven by the motor 26. Each of the plates 30 and 31 is provided with registering apertures as at 34 and 35 respectively, of which four are shown in the present case, although any other number may be provided. The annular supporting member 32 is provided with one aperture in its uppermost portion, as at 36, adapted to register with each pair of apertures in the rotary plates as these apertures pass over the upper portion of their path.

A deflector 38 tips the coins as they fall into the lower part of the receptacle and prevents any of them from remaining on edge against the rear wall 7 with possible clogging of the coins in the receptacle.

The assorting device into which the coins are fed one at a time by the mechanism described above, appears most clearly in Fig. 5 from which it will be seen that it comprises a chute 40 which terminates in a transversely extended, inclined run-way 41 divided into a plurality of coin-receiving pockets 42, 43, 44, 45 and 46, by the coin-engaging projections 47, 48, 49 and 50. In the embodiment shown, the apparatus is adapted to handle half-dollars, quarters, nickels, pennies and dimes, and the first projection 47 is adapted to engage half-dollars, retaining them in the pocket 42 and permitting all other coins to pass beyond. The second projection 48 engages the quarters, retaining them in the pocket 43 and allowing the other coins to pass on. The third projection 49 engages the nickels, retaining them in the pocket 44 and allowing the pennies and dimes to pass on, the former being caught by projection 50 and held in pocket 45 and the dimes passing to the end of the run-way, where they are held in pocket 46.

Each of the coin-receiving pockets is provided with an opening in its bottom through which the coin may pass as hereinafter described. The opening of each pocket is normally closed by means of a gate 51, it being understood that there is a separate gate for each pocket, and that the several gates and their associated parts are of similar construction.

Each gate is composed of a shelf portion 52 and a step portion 53 spaced from the outer edge of the gate and which in the normal position of the gate lies beneath the corresponding opening in the bottom of the coin-receiving pocket, as shown most clearly in Fig. 8. Each gate is carried upon a horizontal slide 54 mounted between pairs of transverse supports 55 and 56 extending between the sides of the casing. Each slide is normally drawn forward by a spring 57 fastened at one end to a pin 58 attached to the slide and at the other end to a pin 59 on the upper one of the transverse supports 55. As appears most clearly in the plan view (Fig. 3), each of the slides 54 is cut away or slotted as at 60 to provide a space through which extends a reciprocating bar 61 which, as shown most clearly in Fig. 5, is composed of an upper vertical portion and a lower vertical portion, these portions being connected by a horizontal offset portion so that the lower portion is displaced to one side of the upper portion to bring the former into proper relation to the coin-wrapping mechanism as will hereinafter appear. The upper vertical portion of each bar is guided in slots formed in the transverse supporting members 55, as at 62, and the lower vertical portion of each bar is guided by a transverse member 63.

As shown most clearly in the detail views, Figs. 8 to 11, the upper portion of each bar is provided with a notch 64 having inclined sides of different length, and the bar is narrower above the notch than it is below. The notch is adapted to coöperate with a lug 65 extending from the slide 54, or between the sides of the slot in the slide in those cases where the reciprocating bars pass through slots instead of cut-away portions, as in the case of the slides for controlling the half-dollars and quarters. Pivoted to the top of each bar 61, is a depending swing 66 which is provided with a slot 67 within which is a pin 68 extending from the corresponding slide in alinement with the lug 65. As appears most clearly in Fig 3, the swings associated with the units for controlling the half-dollars and quarters pass through the slots in the slides 54 of these units, but in the case of the other units, the swings are arranged at one side of the cut-away portions of the slides through which the reciprocating bars pass.

For actuating the bars 61 and swings 66, there are lifts 70 slidably mounted in vertical bearings between the transverse frames 56 and 63. Each lift is provided with a lug 71 adapted to coöperate with a corresponding lug 72 projecting from the rear face of the reciprocating bar. The upper forward edge 73 of the lift is adapted under certain conditions to engage the lower end of the corresponding swing 66 to raise it and the reciprocating bar to which it is attached. Each lift has lugs projecting from its rear face to which is attached a link 74 connected to a crank 75 on a transverse shaft 76 provided near one end with a bevel gear 77 meshing with a pinion 78 on the end of a stub shaft 79 which is the one on which the pinion 19 and gear 20 hereinbefore described are mounted. There is thus provided a driving connection from the shaft 22 which is driven by the motor 26 and the shaft 76 by which the lifts are reciprocated in their respective guideways.

The operation of the parts of the apparatus thus far described is as follows: Coins to be assorted are supplied to the hopper 3, which is rotated through the train of gears connecting it to the shaft 22, it being understood that the motor 26 is running, and the clutch members 23 and 25 are in engagement as shown in Fig. 1. As the aperture 4 in the hopper 3 passes over the lower portion of its path, coins will be discharged into the mechanism for feeding them one at a time to the coin-assorting devices. The coins in falling into the receptacle of the feeding mechanism will strike the deflector 38 and be turned so as to lie parallel to the rotary base 30, 31 of the feeding mechanism. Since this base is continually driven through the gear 15 associated with the driving gears of the apparatus, the coins lying upon the base will be continually agitated and picked up one at a time in the pockets 34 as the latter pass under the coins. As each pocket carries a coin upwardly, it will finally reach the point where the annular member 32 is cut away at 36, and when this occurs the coin will fall through the aperture into the chute 40 and drop into engagement with one of the projections 47, 48, 49 or 50, on the lower end of the run-way according to its denomination.

The gear train which drives the plates 30, 31 of the mechanism by which the coins are fed one at a time to the assorting apparatus, should preferably be so related to the mechanism for controlling the gates beneath the coin pockets, that the gates are operated in proper timed relation to the discharge of coins into the upper end of the coin chute to allow for the time taken by the coins to fall from the feeding mechanism through the chute to their respective pockets, so that when a coin reaches it receiving pocket, the corresponding slide 54 occupies the position shown in Fig. 8 with the top of the step 53 beneath the pocket, so that the coin rests thereon. At this time the corresponding reciprocating bar 61 occupies the position shown in this figure, being held by the lug 65 which is drawn into the bottom of the notch, and the swing 66 is drawn into the position shown by the slot and pin connection 67, 68. As the lift is drawn downwardly by the rotation of shaft 76, its lug 71 finally engages the coöperating lug 72 upon the reciprocating bar, drawing the latter downwardly into the position shown in Fig. 9. As the bar is drawn downwardly, the shorter face of its notch will through its engagement with lug 55 cause the slide 54 to be retracted into the position shown in Fig. 9 so that the coin will drop from the top of the step 53 onto the shelf 52, but the slide will not be retracted enough to release the coin. As the reciprocating bar is drawn downwardly to retract the slide 54, the pin 68 which lies within the slot 67 of the corresponding swing 66, will swing the latter into the position shown in Fig. 9 so that upon the following upward movement of the lift 70, the upper edge 73 of the latter will engage the lower rear edge of the swing and carry the latter and the reciprocating bar connected to it upwardly. As soon as the reciprocating bar begins to rise, the notch therein will release the lug 65 and the slide 54 associated therewith from its retracted position, and the spring 57 will tend to draw the slide forwardly, but such forward movement will soon be arrested by the step 53 coming into engagement with the edge of the coin, thus preventing the lug 65 from following the incline of the notch and holding it in a position with respect to the latter as indicated in Fig. 10. The slot 67 in the swing is so shaped that during the upward movement of the swing and the limited forward movement of the slide until the step engages the edge of the coin, the swing will be held toward the rear with its lower corner above the edge of the lift 70. As long as the swing is in engagement with the lift, the reciprocating bar will be raised, and in the present case this action will continue throughout the entire upward stroke of the lift, but after a slight rise of the reciprocating bar the longer face of its notch will engage the lug 65 and force the latter back to produce a corresponding movement of the slide 54 with the result that when the lift reaches its upper limit of movement, the slide will be retracted enough to remove the gate 51 from beneath the coin thus allowing the latter to fall out of its pocket into a suitable chute 80 by which it is conveyed to the mechanism for wrapping the coins.

The shaft 76 is continually driven and the lifts 70 are continually reciprocating, but it is only when a coin is in a pocket that the sequence of operations described above and illustrated in Figs. 8, 9, 10 and 11 will occur. At other times, that is, when there is no coin in a pocket, the corresponding reciprocating bar and its associated slide will normally occupy the position shown in Fig. 8 and when the corresponding lift passes downwardly to draw the bar into the position shown in Fig. 9, the slide will be retracted as above described. When there is no coin resting upon the gate, there will be nothing to prevent the forward movement of the slide to its normal position, so that the lug 65 following the shorter side of the notch will pass to the bottom of the notch as the bar rises, and the corresponding swing 66 will through the pin and slot connection be swung forward enough to draw its lower corner out of engagement with the top of the lift. This action will occur at the time when the lug 65 has reached the bottom of the notch in the reciprocating bar, so that the apparatus comes back to normal position, and the reciprocating bar is not lifted into the position shown in Fig. 11, although the lift 70 goes to its upper limit of movement.

Each of the shelves 51 and the mechanism associated therewith will go through the same sequence of operations, as described above, but owing to the length of the coin run-way, the dimes and pennies will require an appreciably longer time to reach their respective pockets than will the coins of larger diameter. When each of the coins reaches its stop, the corresponding shelf should be in the position shown in Fig. 8. In order to compensate for the different lengths of the paths over which coins of different denominations have to pass, the cranks 75 are angularly displaced upon the shaft 76 with relation to each other, so that their lifts 70 cause the corresponding reciprocating bars and slides to be operated in proper timed relation to each other.

In the apparatus described above, the rise of the reciprocating bars into the position shown in Fig. 11 is utilized to control the operation of the wrapping mechanism, and may also be employed to actuate a register of the type shown in my co-pending application Serial No. 262,767. This register is mounted in the upper front part of casing 1 and comprises a casing within which are counters adapted to be actuated by gears which in turn are operated by arms mounted upon a common shaft and arranged with their inner ends lying in the paths of the reciprocating bars. Since the complete details of this registering mechanism are included in the subject matter of my co-pending application Serial No. 262,767 they will not be further described herein.

Separate coin wrapping mechanisms each constructed in accordance with this invention are shown for wrapping coins of different denominations but since these mechanisms are of similar construction, a description of one of them will suffice to show the operation of the others.

The coins after being discharged from their respective pockets and counted fall through the chutes 80 which are provided at their bases with horizontal apertures as at 120 to cause the coins to be discharged in horizontal position into a suitable wrapper 121 which will usually be in the form of a paper receptacle closed at its lower end. Each wrapper is contained within a pocket 122 and a number of these pockets are connected at their bases to an endless belt 123 which passes over wheels 124 and 125 having flat faces of a width corresponding substantially to the diameter of the pockets. The rear wheel 124 is mounted upon a shaft between suitable side frames attached to a base which may be detachably secured within the casing of the apparatus, thereby permitting the wrapping mechanism to be removed as a whole. The forward wheel 125 is mounted upon a sleeve 126 loose upon a shaft 127 common to all of the units of the wrapping mechanism. At one end of the sleeve is a star wheel 128 engaged by a holding pawl 129 to prevent accidental movement of the sleeve. At the other end of the sleeve is a ratchet 130 adapted to be engaged by a pawl 131 on a wheel 132 rotatably mounted on a stub shaft 133 and provided on one face with ratchet teeth 134 which are engaged by a spring actuated pawl 135 on a reciprocating bar 136 which at its upper end has a lost motion connection as at 137 with the lower portion of the corresponding reciprocating bar 61. In addition to the ratchet teeth 134, the wheel 132 is provided with one or more extended ratchet teeth 138. At this point it may be explained that the wheel shown in Fig. 14 is provided with fifty effective ratchet teeth 134, one extended ratchet tooth 138 and one actuating pawl 131, this wheel being adapted to be used in cases where it is intended that fifty coins of one denomination shall be supplied to a wrapper. In the case of the wheel shown in Fig. 15, there are two actuating pawls 131 arranged in the same relation. The wheel 132 is provided with twenty effective ratchet teeth 134 on each semi-circumference between the extended teeth 138. This wheel is adapted for use in those cases where twenty coins of any denomination are to be supplied to a wrapper. It will be understood that wheels provided with other numbers of teeth may be used according to the number of coins which it is desired to supply to a wrapper.

There is associated with the wheel 132 a toothed wheel 139 engaged by a spring actuated holding pawl 140 to prevent accidental movement of the wheel 132. There is also associated with the wheel 132 a ratchet wheel 141 having at the point 142 a double space between its teeth, and this double space coincides with the point at which the pawl 131 is attached to the wheel 132, as shown in Fig. 14, or in the case of Fig. 15, there are two double spaces each coinciding with one of the pawls 131. Each unit of the wrapping mechanism has a segmental gear 143 mounted on shaft 127 and having teeth adapted to engage the teeth of the corresponding ratchet 141. The shaft and all of the gears 143 attached thereto may be manually operated by means of a crank 144 attached to one end of the shaft outside of the casing.

For the purpose of automatically crimping the upper ends of the wrappers after they have been filled with coins, there is provided for each coin wrapping unit a rod 145 mounted in transverse bearing members 146 and normally lifted by a spring 147 pressing against the lower bearing member at its bottom end and at its upper end against a shoulder 148 attached to the rod. The upper end of the rod passes through a slot in the end of a pivoted arm 149, and is provided with a shoulder against which the end of the arm bears. The other end of the arm is adapted to be engaged by a pin 150 projecting from the corresponding reciprocating bar 61', so that upon each upward movement of this bar, the arm is swung to depress the rod 145. To produce the crimping effect, it is necessary that the crimping head 151 be given a rotary movement at the same time that it is being depressed. This is obtained by providing the rod 145 with a pin 152 which travels through a slot in a member 153 attached to the lower transverse member 146 and through which the rod 145 passes.

The coin-wrapping apparatus described above operates as follows: At the time when a pocket having an empty wrapper therein is in position beneath the aperture 120 at the end of the chute 80, the corresponding wheel 132 occupies the position shown in either Fig. 14 or 15, which figures, as explained above, show wheels corresponding to different numbers of coins that are to be supplied to a wrapper. Each time that a coin of any particular denomination passes through the apparatus, the corresponding reciprocating bar 61 will be raised to its upper limit of movement, and through the connection with the bar 136 will lift the latter enough to carry the pawl 135 over one of the teeth 134 of the wheel 132. When the bar 61 is carried to its lower position, it will push the bar 136 down, and the pawl 135 will advance the wheel 132 the space of one tooth. Each time a coin of like denomination passes through the apparatus, there will be a corresponding advance of the wheel 132 of the wrapping mechanism for this particular denomination, but at other times the bar 61 will not be raised enough to lift bar 136 on account of the lost motion connection 137 between these bars. In the case of the wheel shown in Fig. 14, after the same has been advanced fifty steps from the position shown in the drawing, the pawl 131 will come into position ready to actuate the ratchet 130, and the tooth 138 will also be in such a position that the pawl 135 will not only advance the wheel 132 one step, but will also engage the upper face of the pawl 138 and not pass off of the latter until the wheel 132 has been advanced another step. The result of this operation will be to advance the pawl 131 an amount equal to two steps of the wheel, and this advance of the pawl 131 will through ratchet 130 rotate the wheel 125 sufficiently to move a new wrapper into position to have coins supplied thereto. This movement will bring the pocket containing the filled wrapper underneath the mechanism for crimping the open end of the wrapper, and this mechanism, since it is continually reciprocated by its operating connection to the corresponding reciprocating bar 61, will crimp the edge of the wrapper over the top of the stack of coins, thus effectively sealing them in the wrapper. The crimping mechanism will be operated a number of times while a wrapper is positioned beneath the same, but each stroke will tend to further crimp the wrapper and fold it more securely over the ends of the coins. After each advance of the pockets, the pawl 129 in coöperation with the star wheel 128 will prevent any accidental displacement of the mechanism until the next advance of the pockets takes place. In the case of the mechanism shown in Fig. 15, there will be two advances of the coin pockets during each complete revolution of the wheel 132 on account of the fact that two sets of teeth 138 and pawls 131 are provided.

It may happen in the operation of the apparatus that when it is stopped some or all of the wrappers will be only partly filled. Such wrappers, or at least the coins therein, will ordinarily be removed from beneath the coin chutes so that upon a subsequent operation of the apparatus, the coins will be supplied to empty wrappers. It is therefore necessary that the mechanism for counting the coins supplied to the wrappers be reset to its zero position. If the wheels 132 occupy any positions other than those shown in Figs. 14 and 15, rotation of the shaft 127 will through the gear 143 and ratchet 141 turn the wheel 132 until the double space 142 comes into the position shown in these figures, in which case the gear 143 will slide by the ratchet 141 without producing any movement of the latter. This action will occur when the parts of the mechanism are in the positions that they should occupy at the start of an operation of filling a wrapper with coins. Manual operation of the shaft 127 by the crank 144 will thus reset all of the wheels 132 of the wrapping mechanism into their normal position so that upon a subsequent operation of the apparatus, the predetermined numbers of coins may be supplied to the wrappers.

I claim:

1. In a coin-handling machine, a plurality of receptacles adapted to hold coin wrappers, means for supplying coins to the wrappers, a ratchet wheel, a reciprocating coin-controlled member for imparting a step-by-step movement to the ratchet wheel for each coin supplied to a wrapper, means associated with the ratchet wheel whereby the member may produce additional movement of the wheel after a predetermined number of coins have been supplied to the wrapper, and means whereby such additional movement of the ratchet wheel will advance the receptacles to bring an empty wrapper into position to be filled with coins.

2. In a coin handling machine, a ratchet wheel, a series of receptacles adapted to contain coin wrappers, means for causing progressive movement of said receptacles, a ratchet wheel associated with said means, means for supplying coins to said wrappers, means for imparting to said first named ratchet wheel a step-by-step advance for each coin supplied to a wrapper until a predetermined number of coins have been deposited therein, and means associated with said first named ratchet wheel and adapted to advance said second ratchet wheel, when such predetermined number of coins have been deposited, to bring an empty wrapper into position to be filled with coins.

3. In a coin-handling machine, a plurality of receptacles adapted to hold coin wrappers, means for advancing the receptacles, means for supplying coins to the wrappers, a ratchet wheel, a reciprocating coin-controlled member provided with a pawl for imparting a step-by-step movement to the ratchet wheel for each coin supplied to a wrapper, a tooth on the ratchet wheel projecting beyond the ratchet teeth adapted to be engaged by the pawl to produce additional movement of the wheel after a predetermined number of coins have been supplied to the wrapper, and a pawl on the ratchet wheel for actuating the means for advancing the receptacles upon such additional movement of the ratchet wheel to bring an empty wrapper into position to be filled with coins.

4. In a coin-handling machine, a plurality of receptacles adapted to hold coin wrappers, a member provided with a channel through which coins may fall and be discharged into the wrappers, a ratchet wheel, coin-controlled means for imparting a step-by-step rotation to the ratchet wheel, for each coin that passes through the member, means for moving said receptacles to bring them successively into position with respect to the discharge end of the member, and means associated with the ratchet wheel adapted to be brought into engagement with and actuate the moving means by the movement of the coin-controlled means when the last of a predetermined number of coins has been discharged into a wrapper.

5. In a coin-handling machine, a ratchet wheel, coin-controlled means for imparting a step-by-step rotation thereto, a plurality of receptacles adapted to hold coin wrappers, means for supplying coins to said wrappers, means for moving said receptacles to bring them successively into position with respect to the coin-supplying means, and means associated with the ratchet wheel whereby it may be advanced an increased amount by the coin-controlled means when a predetermined number of coins have been supplied to a wrapper to actuate said moving means to bring an empty wrapper into position with respect to said coin-supplying means.

6. In a coin-handling machine, a plurality of receptacles adapted to hold coin wrappers, means for supplying coins to the wrappers, a ratchet wheel, a reciprocating coin-controlled member for imparting a step-by-step movement to the ratchet wheel for each coin supplied to a wrapper, means actuated by the ratchet wheel for bringing successive receptacles beneath the coin supplying means, means for crimping the end of a filled wrapper over the coins therein, means for imparting longitudinal movement to the crimping means, and means for imparting rotary movement to the crimping means while it is moving longitudinally.

7. In a coin-handling machine, a ratchet wheel, coin-controlled means for imparting a step-by-step rotation thereto, a plurality of receptacles adapted to hold coin wrappers, means for supplying coins to said wrappers, means adapted to be actuated by said ratchet wheel to bring successive receptacles beneath said coin-supplying means upon said ratchet wheel being rotated a predetermined number of steps, a crimping head adapted to engage the upper end of a wrapper after it has been filled with coins, and means actuated by said coin-controlled means to impart a combined longitudinal and rotary movement to said head to crimp the end of a wrapper over the coins therein.

8. In a coin-handling machine, a ratchet wheel, coin-controlled means for imparting a step-by-step rotation thereto, a plurality of receptacles adapted to hold coin wrappers, means for supplying coins to said wrappers, means adapted to be actuated by said ratchet wheel to bring successive receptacles beneath said coin-supplying means upon said ratchet wheel being rotated a predetermined number of steps, a second ratchet wheel associated with the first named ratchet wheel, and means for manually moving said second ratchet wheel to set said first named ratchet wheel so that upon a subsequent operation by said coin-controlled means, it will be moved the said predetermined number of steps.

9. In coin-handling apparatus provided with mechanism for assorting the coins into different denominations, and a counter for counting the coins as they are discharged from said assorting mechanism, the combination of a plurality of coin chutes each adapted to receive coins of a single denomination after they have been discharged from the coin-assorting mechanism, a series of receptacles positioned beneath each chute and adapted to hold wrappers into which the coins may fall directly from the chute, and continuously-driven means engageable with successive coins and operatively connected to the coin-counter actuating devices for allowing a predetermined number of coins to fall into a wrapper, and thereafter advancing the corresponding series of receptacles to bring an empty wrapper in position to be filled with a like predetermined number of coins.

10. In coin-handling apparatus, the combination of a coin receiving pocket, a reciprocating member, a reciprocating bar adapted to be moved by said member, a second reciprocating bar having a lost motion connection with said first named reciprocating bar, a ratchet wheel, means associated with said second bar for imparting a step-by-step rotation to said ratchet wheel, a plurality of receptacles adapted to hold coin wrappers, means for conveying coins from said pocket to said wrappers, means operatively associated with said receptacles and adapted to be actuated by said ratchet wheel to bring successive receptacles beneath said coin-conveying means upon said ratchet wheel being rotated a predetermined number of steps, a member pivotally attached to said first named bar and adapted to be moved into engagement with the reciprocating member when said bar is moved in one direction by the member, coin-controlled means for holding said pivotal member in engagement with said reciprocating member when a coin is in the pocket to permit said first named bar to be moved in the opposite direction to operate said second bar to advance the ratchet wheel one step, and means associated with said first named bar for thereafter controlling said coin-controlled means to permit the coin to be discharged from said pocket into said conveying means and carried to a wrapper, said coin-discharging and ratchet-wheel-advancing functions occurring upon the passage of each coin through the pocket until a predetermined number of coins have been supplied to a wrapper, said predetermined number of coins depending upon the predetermined number of step-by-step movements of the ratchet wheel required to bring successive receptacles into coin-receiving position.

11. In a coin-handling machine, a plurality of receptacles adapted to hold coin wrappers, means for supplying coins to the wrappers one at a time, a ratchet wheel, continuously driven means adapted to engage a coin as it passes through the supplying means for advancing the ratchet wheel, means for moving the receptacles to bring them successively into position with respect to the discharge end of the supplying means, and means associated with the ratchet wheel adapted to actuate the moving means by the movement of the coin-controlled means when the last of a predetermined number of coins has been discharged into a wrapper.

12. In a coin-handling machine, a plurality of receptacles adapted to hold coin-wrappers, means for supplying coins to the wrappers, a ratchet wheel, a reciprocating coin-controlled member for imparting a step-by-step movement to the ratchet wheel for each coin supplied to a wrapper, means associated with the ratchet wheel whereby the member may produce additional movement of the wheel after a predetermined number of coins have been supplied to the wrapper, means whereby such additional movement of the ratchet wheel will advance the receptacles to bring an empty wrapper into position to be filled with coins, and means for preventing accidental displacement of the receptacles while coins are being supplied thereto.

13. In a coin-handling machine, a belt, a plurality of cylindrical receptacles attached to the belt and adapted to hold coin wrappers, means for supplying coins to the wrappers, rotary members for carrying the belt, a ratchet wheel associated with one of the rotary members, a second ratchet wheel, means under the control of coins as they pass through the supplying means for advancing the second ratchet wheel, and means associated with the second ratchet wheel for actuating the first ratchet wheel by the movement of the coin-controlled means when the last of a predetermined number of coins has been discharged into a wrapper, whereby the belt may be advanced to bring an empty wrapper into position to be filled with coins.

14. In a coin-handling machine, a plurality of receptacles adapted to hold coin wrappers, means for supplying coins to the wrappers, a coin-controlled member provided with a pawl, a wheel provided with a series of ratchet teeth corresponding in number to the number of coins which are to be supplied, one tooth of said series being extended so that when it is engaged by the pawl an increased movement will be imparted to the wheel, means for advancing the coin wrappers, and means associated with the wheel for actuating the advancing means when such additional movement is imparted to the wheel.

15. In a coin handling machine, means for holding a series of coin wrappers, means for advancing said holding means to bring an empty wrapper into coin receiving position after the previous wrapper has been filled, a feed chute for delivering coins to an empty wrapper, and continuously driven coin controlled means engageable with a coin as it passes along the feed chute for controlling said advancing means.

16. In a coin handling machine, means for holding a series of coin wrappers, a feed chute for delivering coins to a wrapper in said holding means, a step-by-step control for moving said wrapper holding means to bring an empty wrapper into coin receiving position when a previous wrapper has been filled with a predetermined number of coins, and coin controlled means for actuating said step-by-step control, comprising an element which is periodically moved into and out of the path of coins in said feed chute, said element causing the actuation of the said step-by-step control only when it has contacted with and released a coin for delivery to a coin wrapper.

17. In a coin handling machine, means for holding a series of coin wrappers, a ratchet wheel for controlling said holding means, a feed chute for delivering coins to a wrapper held in a coin receiving position and coin controlled means for controlling the operation of the ratchet wheel, comprising an element which is periodically moved into and out of the path of coins traveling in said feed chute, and which causes the actuation of said ratchet only upon contacting with a coin and releasing it for delivery to a coin wrapper.

In testimony whereof I affix my signature.

EDWARD B. PAUL.